SNAP ACTION MICROWAVE SWITCHING APPARATUS WITH TRANSMITTER POWER SUPPLY INTERRUPTION WHILE SWITCHING

Filed June 27, 1963 2 Sheets-Sheet 1

United States Patent Office 3,253,222

Patented May 24, 1966

3,253,222

SNAP ACTION MICROWAVE SWITCHING APPARATUS WITH TRANSMITTER POWER SUPPLY INTERRUPTION WHILE SWITCHING

Bernard Goldstein, New Rochelle, N.Y., assignor to Douglas Microwave Company, Inc., Mount Vernon, N.Y.

Filed June 27, 1963, Ser. No. 291,103
10 Claims. (Cl. 325—151)

The present invention relates to switching apparatus and is primarily intended for microwave transmitters. In that application, this apparatus makes it possible to switch the transmitter output from one load, such as an antenna, to another load, such as a dummy load. While the invention may well have other applications, it is best understood in connection with its primary application. This is intended as exemplary, and not as limiting.

When it becomes necessary to switch the output of a transmitter from one load to another, it is important to protect the selective microwave switch against damage. The high frequency energy ouput of the transmitter should be interrupted before attempting to disconnect the high-frequency switch connections. To do this, the transmitter should be deenergized; but this alone is not enough inasmuch as there is danger of stored electrical energy in the transmitter being delivered duriing a brief interval after the transmitter power supply has been disconnected. It is also important to make sure that the new selected position of the output switch is set and at rest before transmitter power is turned on.

A wide variety of complicated switching and interlocking circuits have been employed for achieving the proper sequencing of the switching at the transmitter output and at its power supply. An object of the present invention resides in the provision of a relatively simple and reliable mechanism for operating the microwave-output selector switch of the transmitter and the power-supply switch of the transmitter in proper sequence.

A feature of the invention resides in the provision of a common drive for operating both the transmitter power supply switch and the microwave load selector switch, in an arrangement where the transmitter power supply switch is operated directly and the output selector switch is operated indirectly. Indirect operation of the selector switch includes a resilient coupling and detent means which arrests the selector switch in any given position until after the power supply switch has been opened. Further, when the selector switch is released, it reaches its next selected position before the direct drive can again close the transmitter power supply switch. Due to the spring coupling, which is charged with stored energy, the selector switch moves ahead of the drive, so that it overtravels and reaches its new position before the direct drive can close the power-supply switch of the transmitter.

In the case of a spring coupling such as that just mentioned, there is a possibility of mechanical binding occurring that might interfere with the normal intended mode of operation of the coordinated switches. Actually there is a substantial amount of friction developed at the engaged parts of the selector switch. A further object of the invention resides in further improving the coordinating means to reduce the consequence of any such mechanical interference to a minimum. Briefly, this feature of the invention is achieved through the use of a mechanical follow-up or positive drive so that, after the transmitter power-supply switch has opened, and after the detent that arrests the selector switch has been released, a part connected to the drive shaft advances into engagement with a rigid part connected to the rotor of the selector switch and provides a positive drive connection that tends to overcome mechanical binding of the selector-switch rotor, if binding should occur. The positive drive arrangement also has the advantage of reducing the stresses imposed on the spring coupling during switch operation, thus making the mechanism more durable; and the positive-drive parts further make the coupling spring less critical and thus easier to design and manufacture. Additionally, the positive drive parts limit the extent of overtravel of the selector switch rotor after is detent has been released and the rotor is spring-impelled toward the next selective position. The advance of the rotor is limited by the positive-drive parts.

The nature of the invention, and the foregoing and other objects and features will be more fully appreciated from the following detailed description of an illustrative embodiment that incorporates the various features of the invention. This embodiment is shown in the accompanying drawings, forming a part of the present disclosure. In the drawings.

Figures 1, 2, 3, 4:
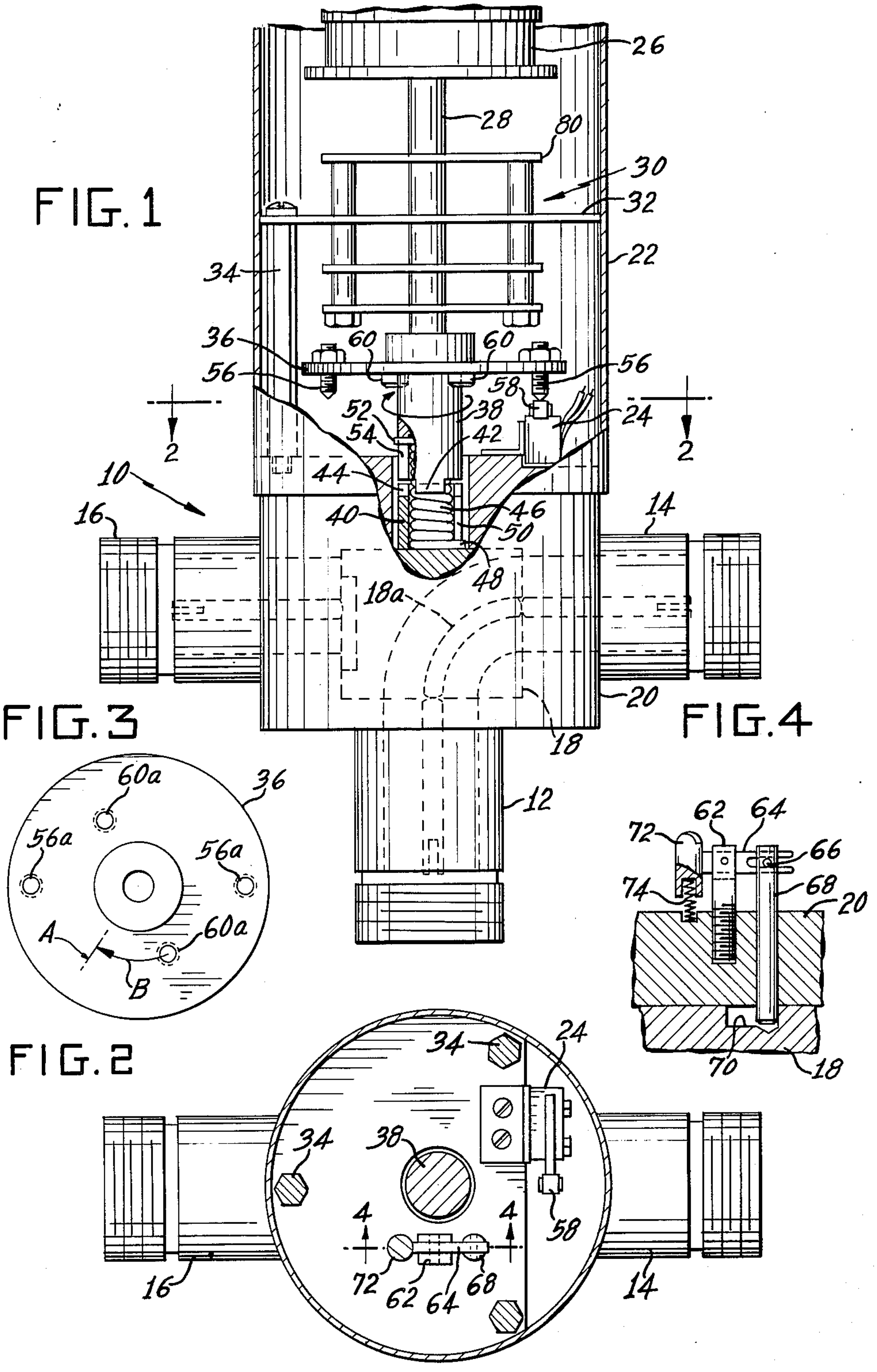
FIGURE 1 is a side elevation, partly in section, of the illustrative embodiment.
FIGURE 2 is a horizontal cross-section of the embodiment of FIGURE 1, viewed as indicated by the section line 2—2 in FIGURE 1.
FIGURE 3 is a top plan view of one of the elements in FIGURE 1.
FIGURE 4 is a fragmentary view, largely in cross-section, viewed as indicated by the section line 4—4 of FIGURE 2.

Referring first to FIGURES 1 to 4, a coaxial microwave selector switch 10 includes a coaxial input terminal 12 and a pair of coaxial output terminals 14 and 16, and the selector switch includes a rotor 18 that has a coaxial segment to connect input terminal 12 to either output terminal 14 or 16. The coaxial segment in rotor 18 includes a center conductor 18*a*, an outer coaxial conductor formed by the metal rotor, and the customary insulation 18*b*. Terminals 12, 14 and 16 extend from a body 20 in which rotor 18 is mounted for rotation about a vertical axis. Firm contact is established between the center conductor 18*a* and the center conductor of either selected terminal 14 or 16.

The driving mechanism for rotor 18 is contained within a metal case 22, which also contains a transmitter power-supply switch 24. An electrical driving unit 26 is suitably mounted within case 22 near the top thereof. This may be a low-speed drive unit including an electric motor and containing reduction gearing. However, in a practical embodiment, a well-known rotary solenoid and ratcheting mechanism proved quite suitable. Depending on the design chosen, this form of drive may execute four to eight rotary indexing motions in completing each 180-degree rotation of the drive shaft 28.

A multiple-deck switch assembly 30, operable by shaft 28, is supported on a plate 32 carried by a number of posts 34 secured to body 20 of the rotary selector switch. Transmitter power-supply switch 24 is suitably secured to body 20 of the rotary selector switch. Cam plate 36 is carried by shaft 28 and an enlarged shaft 38 extends from the bottom of cam plate 36. Shafts 28 and 38 are united and rotate together. A tubular portion of shaft 38 is disposed endwise opposite to another tubular part 40 that is secured to rotor 18. A projecting dog or tooth 42 extends from the lower end of shaft 38, occupying about 45 degrees of arc, for example. At the same horizontal level, a companion part 44 extends from tubular element 40, part 44 occupying approximately 180 degrees (in this embodiment) about the common axis of tubular elements 38 and 40. In the normal at-rest condition of the switch in which rotor 18 connects coaxial terminal 12 to one of the coaxial terminals 14 or 16 and in which transmitter switch 24 is held closed, part 42 is disposed diametrically and symmetrically opposite part 44, with angular clearance in both directions. A helical coil spring 46 is contained within tubular elements 38 and 40, one end 48 of the coil spring being received in a slot 50 in member 40, and the opposite end 52 of the coil spring being captive in slot 54 that is formed in shaft 38.

Cam plate 36 includes a diametrically opposite pair of screws 56 that may be adjusted to engage the roller 58 of switch 24, to hold that switch closed. This switch is advantageously a snap-acting switch, such as a "microswitch" that contains internal means for normally biasing the switch open. Plate 36 also includes a pair of detent-releasing cam parts 60, screw threaded into cam plate 36. In FIGURE 3, cam plate 56 is illustrated as having threaded holes 56*a* and 60*a* which receive and locate the cam parts 56 and 60 just described. In operation, plate 36 rotates clockwise.

Not shown in FIGURE 1, but mounted in front of shaft 38, is a detent mechanism operated by cam parts 60. This detent mechanism is shown in FIGURES 2 and 4. It includes a stationary post 62 that is mounted in body 20 of a rotary selector switch. Lever 64, pivoted to post 62, is slotted at its right-hand end for straddling pin 66 that is fixed to detent rod 68. This rod is slidably mounted in a bore in body 20, and the lower end of the detent rod is received in an arcuate groove or slot 70 formed in rotor 18. There are two such slots in this rotor, diametrically opposite each other, located so that rod 68 is received in one such groove when connector 18*a* of the rotor is in proper position to line up with the center conductor of one of the coaxial output terminals 14 or 16. As was previously mentioned, shaft 38 is at rest when cam part 56 holds switch 24 closed; and in this position, spring 46 which is initially assembled with a preliminary torsion bias, holds the right-hand end of slot 70 (as viewed in FIGURE 4) against detent rod 68.

At the left-hand end of lever 64 there is a cam-follower 72 whose top is curved, and aligned with a tangent to a circle about the center of shaft 38 as shown in FIGURE 2. Cam-follower 72 is normally raised so as to be close to the lower face of plate 36, biased into that position by compression coil spring 74. Cam-follower 72 normally is disposed below plate 36 at the position represented by the broken line designated A in FIGURE 3. Consequently, it is necessary for plate 36 to rotate through an initial delay angle represented by the arrow B before detent-releasing cam-follower 72 is engaged by one of the cam parts 60.

The operation of the switching apparatus thus far described may now be explained. Shaft 28–38 is slowly rotated clockwise (as viewed in FIGURE 2) when it is intended that terminal 12 and rotor 18 shall be disconnected from terminal 14 (as illustrated) and connected to terminal 16. Almost immediately cam part 56 moves out of engagement with roller 58 and switch 24 opens. As will be seen, this interrupts the supply of power to the transmitter. Rotor 18 remains at rest during the initial rotation of cam plate 38 and shaft 28–38 as a result of the engagement of detent rod 68 in slot 70 of rotor 18. During the initial rotation, the normal torsion bias of spring 46 is increased, further energy thus being stored in this coupling spring. Cam part 60 then comes into contact with cam follower 72 and lifts rod 68 out of recess 70.

When rotor 18 is freed for rotation by removal of the detent, spring 46 rapidly advances rotor 18 toward its next position.

Rotor 18 utilizes the stored energy represented by the initial bias in spring 46 and the energy added during the initial rotation of shaft 38 while rotor 18 was held by detent rod 68. When rotor 18 has indexed nearly 180 degrees, detent rod 68 drops into the next slot 70. Continued advance of the drive shaft causes the spring bias to drive rotor 18 forward so that the trailing end of groove 70 engages detent rod 68. At that time the center conductor of terminal 16 is engaged by conductor 18*a* of rotor 18.

Detent 68 arrests rotor 18 at a time substantially in advance of the engagement of the next cam part 56 with roller actuator 58 of switch 24. Consequently, the microwave selector switch has been set before the transmitter power-supply switch is reclosed. Further rotation of shaft 28–38 through a trailing delay angle carries cam part 56 into the position represented in FIGURE 1 and thus recloses the transmitter power-supply switch 24.

Figures 5, 6:
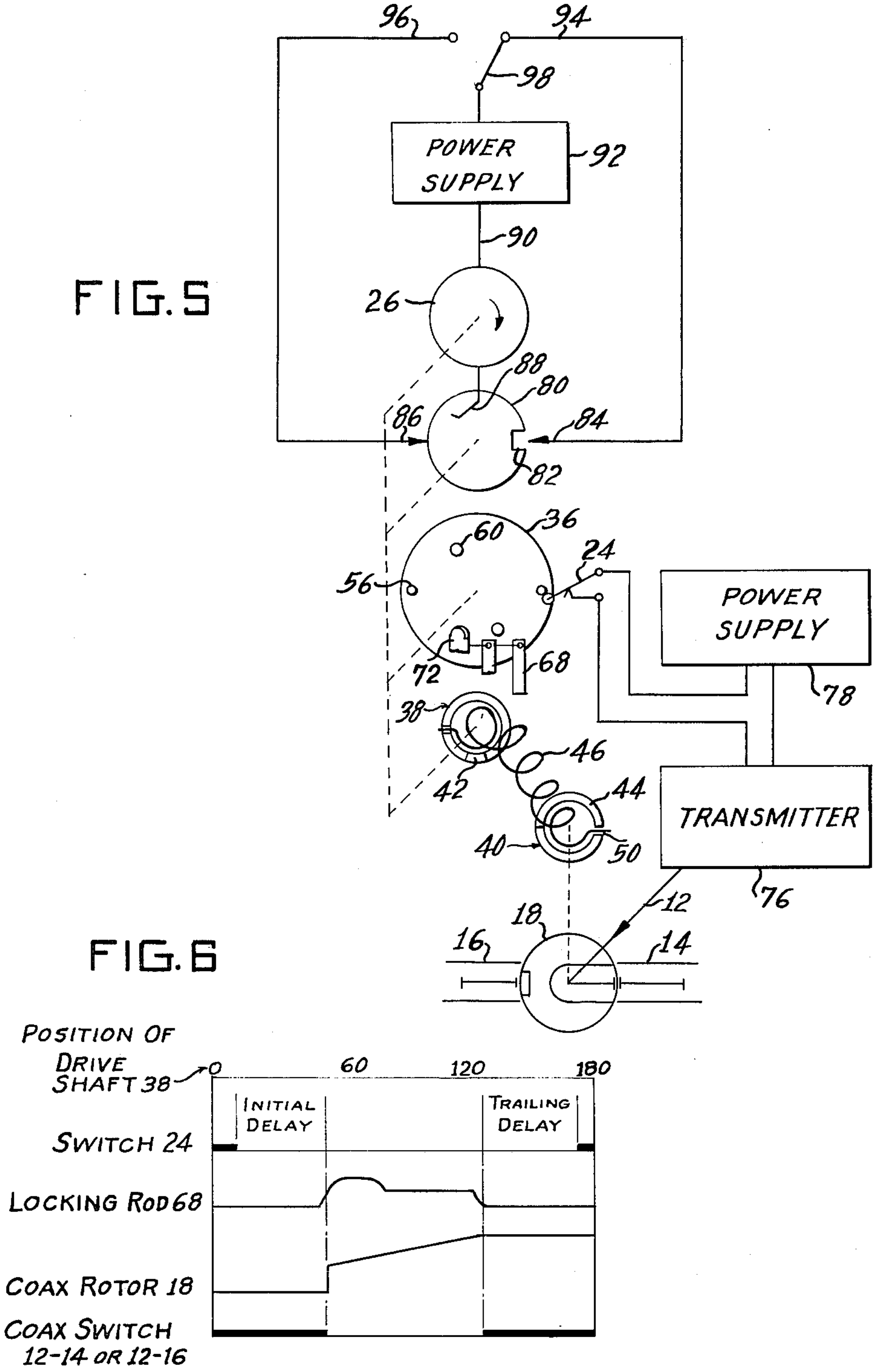
FIGURE 5 is a wiring diagram illustrating the coordination of the switching apparatus in FIGURES 1 to 4, and further including the apparatus that is controlled by and that controls the switching apparatus of FIGURES 1 to 4.
FIGURE 6 is a timing diagram of the operation of the embodiment in FIGURES 1 to 5, inclusive.

The foregoing timing is illustrated in FIGURE 6.

It has been mentioned above that, when cam part 56 engages cam-follower 72 and lifts detent rod 68 out of engagement with rotor 18, spring 46 ordinarily causes rotor 18 to rotate. In the event of "sticking" of the rotor, tooth 42 provides positive drive for the rotor by engaging companion rigid part 44 carried by the rotor, thus overcoming initial mechanical binding.

When rotor 18 is advanced quickly under spring impetus, it assumes a rotational position in advance of its normal or at-rest relationship to shaft 28–38 and cam plate 36. This overtravel is accommodated by the clearance angle between tooth 42 and the trailing end of companion part 44. The extent of overtravel is limited by this clearance angle, so that parts 42 and 44 act to prevent excessive spring-impelled rotation of the rotor. This arrangement provides assurance against advance of rotor 18 out of the intended phase relationship to cam plate 36 and multi-deck switching assembly 30.

The apparatus in FIGURES 1 to 4 is shown diagrammatically in FIGURE 5, together with related parts of a transmitter. Transmitter 76 produces microwave energy at a high power level. The transmitter is connected by terminal 12 to one of the coaxial microwave output terminals 14 or 16. Power supply 78 is normally connected to transmitter 76 under control of switch 24. A relay (not shown) is included, normally, between switch 24 and the controlled power circuit.

FIGURE 5 illustrates one form of control for motor unit 26 to cause it to advance 180 degrees. Details of the stepwise advancing arrangement which would be used in the event that motor unit 26 is a ratcheting rotary solenoid are omitted inasmuch as that particular form of motor is not essential and its description would not contribute to an understanding of the present invention.

Conductive disc 80 has a notch or a dead portion 82 opposite terminal 84. Disc 80 and contacts 84 and 86 are operable by drive unit 26. Conveniently, disc 80 may be one of the decks of switch assembly 30 that is operated by shaft 28 (FIGURE 1). A wiping contact 88 on conductive disc 80 extends to drive unit 26. The opposite terminal of drive unit 26 extends by a connection 90 to a power supply 92, and the opposite terminal of the power supply, in turn, is connected to line 94 or 96 by a single-pole-double-throw switch 98.

In operation, with switch 98 in the position illustrated in FIGURE 5, the circuit from power supply 92 to drive unit 26 is interrupted by the position of the dead section 82 of disc 80 opposite contact 84. If it is intended to operate the apparatus of FIGURE 1 through a 180-degree rotation, switch 98 is shifted to engage line 96 and thus complete a circuit through contacts 86 and 88 to the motor unit 26. Rotation of the motor unit and of disc 80 will continue, in a predetermined direction, until the dead section 82 reaches terminal 86 and then the drive unit will stop. Switch 98 may be located at a remote point from the switching apparatus, thus providing for remote control. In the event that the switching apparatus is convenient and readily accessible for manual operation, a knob may be provided for rotating shaft 28 in lieu of or in addition to drive unit 26; and in that event, it may be desirable to employ a conventional one-way rotational lock (not shown) to guard against operation of shaft 28 in the direction opposite to that described.

FIGURE 5 shows, perhaps better than the other figures, the arcuate extent and the relationship between tooth 42 and its companion rigid element 44 which are secured, respectively, to shaft 38 and rotor 18.

The foregoing mechanism represents a highly successful switch-coordinating mechanism for operating a transmitter power-supply switch and a transmitter load-selector switch in the desired sequence, namely, first interrupting the supply of power to the transmitter, then indexing the selector switch after a delay time interval (to insure dissipation of electrical energy in the transmitter before indexing of the switch rotor starts), followed by advance of the switch rotor 18 to the next selective position, where it is arrested, and completing the switching sequence, after a further delay time interval, by reclosing transmitter power-supply switch 24.

The foregoing switch is readily modified, for example by increasing the number of selective terminals of switch 10. Also, switch 24 and cam parts 56 may be replaced by a switch arm and correspondingly positioned stationary contacts in one of the decks of switch assembly 30. Varied application of the novel features and various modifications will naturally occur to those skilled in the art in the light of the foregoing, and consequently the invention should be broadly construed in accordance with its full spirit and scope.

What is claimed is:

1. Transmitter switching means including a drive shaft, a transmitter power-supply switch operable by the shaft and directly coupled thereto for energizing a transmitter in predetermined angular shaft positions and for deenergizing the transmitter between such shaft positions, a microwave switch having means to provide a plurality of angularly displaced microwave paths, successively, said microwave switch having a rotor, detent means for arresting said rotor in certain angular positions to establish said paths, cam means operable by said shaft after advance of said shaft through a delay angle following opening of the power-supply switch for releasing said detent means, and a spring coupling between said shaft and said rotor and increasingly charged during shaft rotation prior to release of said detent means for advancing said rotor rapidly upon release of said detent means.

2. Transmitter switching apparatus in accordance with claim 1, wherein said rotational spring coupling is initially biased for advancing said rotor toward the next selective position, the bias being augmented during the initial shaft rotation, prior to release of said detent means.

3. Transmitter switching apparatus in accordance with claim 1, wherein said spring coupling includes two coaxial elements one of which is fixed to said shaft and the other of which is fixed to said rotor, said spring coupling further including a torsion spring whose extremities bear against said coaxial elements, respectively.

4. Transmitter switching means in accordance with claim 1, wherein said spring coupling includes two tubular elements in endwise confronting coaxial alignment, said spring coupling further including a helical torsion spring contained in said tubular elements and the ends of the spring being secured to said elements, respectively.

5. Transmitter switching means in accordance with claim 4, wherein said torsion spring is initially charged so as to bias the rotor toward its next position.

6. Transmitter switching means in accordance with claim 1, wherein said coupling means further includes rigid driving and driven parts fixed to said shaft and to said rotor, respectively, said parts having rotational clearance therebetween in one rotational direction initially and until release of said detent means by said cam means and being thereafter effective to provide positive drive coupling between said shaft and said rotor.

7. Transmitter switching apparatus in accordance with claim 6, wherein said parts also have rotational clearance therebetween initially in the direction opposite said one direction for enabling said rotor to overtravel and thus to advance through an angle greater than the angle of shaft rotation at the time that the detent means is released as aforesaid.

8. Transmitter switching apparatus in accordance with claim 1, further including electric motor means operable in a given direction for driving said shaft, and wherein said spring coupling is initially charged so as to bias said rotor in said direction, said rotor being retained by said detent means in said initial position.

9. Transmitter switching apparatus, including rotary drive means, switching means directly operable by said drive means for energizing a transmitter in predetermined angular positions of the drive means, a microwave switch including a microwave input coupling, a plurality of angularly spaced microwave output couplings, and a rotor having a microwave coupling segment to connect said input coupling to said output couplings in succession, and coordinating means between said rotor and said rotary drive means with its directly operable transmitter switching means, said coordinating means including a rotational spring coupling between said drive means and said rotor, releasable detent means cooperating with said rotor for arresting the rotor coupling segment in alignment with said output couplings, respectively, said detent means being releasable by said drive means at angular positions of the latter displaced from said predetermined positions, said spring coupling being biased to operate said rotor through a greater angle than that through which the drive means has operated upon release of the detent means so that the selector switch will reach its next selective position before the drive means advances the transmitter switching means into position for reenergizing the transmitter.

10. Transmitter switching apparatus including transmitter power-supply switching means, a microwave switch having a multiple-position rotor, and sequencing means therefor, said sequencing means being operable to open said power supply switching means initially, to disconnect said microwave switch from its initial selective position after a delay time interval following opening of said power supply switching means, to reconnect said microwave switch at another output position, and to reclose said power supply switching means after a delay time following setting of said rotor at another selective position, said coordinating means including a drive shaft, first cam means directly connected thereto for closing said transmitter power supply switching means in predetermined selective positions of the cam means and to effect opening thereof between said selective positions of the cam means, detent means normally arresting said microwave switch rotor in any one of its selective positions, a rotational spring coupling between said drive shaft and said rotor, said spring coupling being increasingly energized as the shaft is operated while the rotor is arrested by said detent means, second cam means directly connected to said shaft and cooperable with said detent means after predetermined rotation of said shaft out of a power-supply energizing position for releasing said detent means, said rotor thereupon being advanced by the energized spring coupling and by the drive shaft until said rotor reaches its next selective position and said detent means thereupon arresting said rotor, said first cam means being related to said second cam means for effecting reclosing of the power supply switch only after predetermined further rotation of said drive shaft.

References Cited by the Examiner

UNITED STATES PATENTS 2,107,138 2/1938 Bird ---------------- 200—66

2,840,786 6/1958 Schunemann et al. ---- 200—153

2,855,525 10/1958 Schunemann -------- 325—129

DAVID G. REDINBAUGH, *Primary Examiner.*

B. V. SAFOUREK, *Assistant Examiner.*